United States Patent
Goodsitt et al.

(10) Patent No.: US 12,282,734 B2
(45) Date of Patent: Apr. 22, 2025

(54) PROCESSING AND CONVERTING DELIMITED DATA

(71) Applicant: Capital One Services, LLC, McLean, VA (US)

(72) Inventors: Jeremy Goodsitt, Champaign, IL (US); Galen Rafferty, Mahomet, IL (US); Samuel Sharpe, Cambridge, MA (US); Grant Eden, San Francisco, CA (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/183,027

(22) Filed: Mar. 13, 2023

(65) Prior Publication Data

US 2024/0311554 A1    Sep. 19, 2024

(51) Int. Cl.
| | |
|---|---|
| G06F 40/18 | (2020.01) |
| G06F 16/22 | (2019.01) |
| G06F 16/25 | (2019.01) |
| G06F 40/103 | (2020.01) |
| G06F 40/151 | (2020.01) |

(52) U.S. Cl.
CPC .......... *G06F 40/18* (2020.01); *G06F 16/2282* (2019.01); *G06F 16/258* (2019.01); *G06F 40/103* (2020.01); *G06F 40/151* (2020.01)

(58) Field of Classification Search
CPC ...... G06F 40/18; G06F 40/103; G06F 40/151; G06F 16/258; G06F 16/2282
See application file for complete search history.

(56) References Cited

U.S. PATENT DOCUMENTS

| 6,549,916 B1 * | 4/2003 | Sedlar ................... G06F 16/10 |
| 8,280,853 B1 * | 10/2012 | Lai ........................ G06F 16/113 |
| | | 707/661 |
| 10,303,999 B2 | 5/2019 | Hertz et al. |
| 11,379,763 B1 * | 7/2022 | Vontobel ................. G06N 3/08 |

(Continued)

FOREIGN PATENT DOCUMENTS

KR    101599145 B1    3/2016

OTHER PUBLICATIONS

Tammo Krueger, et al., "Learning Stateful Models for Network Honeypots," AlSec' 12 (Oct. 19, 2012), 12 pages.

(Continued)

*Primary Examiner* — Thu V Huynh
(74) *Attorney, Agent, or Firm* — Harrity & Harrity, LLP

(57) ABSTRACT

In some implementations, a data processing device may receive, from a data source, a set of delimiter-separated values and may divide the set of delimiter-separated values into a plurality of subsets. Each subset may correspond to at least a portion of a column or correspond to at least a portion of a row. The data processing device may generate a plurality of vectors, corresponding to the plurality of subsets, according to an embedding space. The data processing device may compare the plurality of vectors to each other and may select a row or a column of the set of delimiter-separated values as one or more headers based on comparing the plurality of vectors to each other. Accordingly, the data processing device may output a tabular data structure including the one or more headers distinguished from a remainder of the set of delimiter-separated values.

20 Claims, 8 Drawing Sheets

(56) References Cited

U.S. PATENT DOCUMENTS

| | | | | |
|---|---|---|---|---|
| 11,922,348 | B2* | 3/2024 | Lyman | G06T 7/0014 |
| 2004/0107025 | A1* | 6/2004 | Ransom | G06Q 50/06 |
| | | | | 700/286 |
| 2007/0282864 | A1* | 12/2007 | Parees | G06Q 10/06 |
| 2013/0290338 | A1* | 10/2013 | Lee | G06F 16/36 |
| | | | | 707/739 |
| 2015/0186352 | A1* | 7/2015 | Greenwood | G06F 40/14 |
| | | | | 715/217 |
| 2015/0261794 | A1* | 9/2015 | Lehrian | G06F 40/18 |
| | | | | 707/807 |
| 2016/0132940 | A1* | 5/2016 | Frommann | G06Q 30/0276 |
| | | | | 705/14.48 |
| 2016/0275250 | A1* | 9/2016 | Park | G06Q 10/10 |
| 2016/0358024 | A1* | 12/2016 | Krishnakumar | |
| | | | | G06V 30/19127 |
| 2017/0116171 | A1* | 4/2017 | Villard, Jr. | G06F 40/18 |
| 2018/0349477 | A1* | 12/2018 | Jaech | G06F 16/9535 |
| 2019/0102620 | A1* | 4/2019 | Siddiq | G06F 16/24575 |
| 2020/0242506 | A1* | 7/2020 | Kelly | G06F 18/213 |
| 2021/0019287 | A1* | 1/2021 | Prasad | G06N 3/08 |
| 2021/0232908 | A1* | 7/2021 | Xian | G06N 3/045 |
| 2023/0038091 | A1* | 2/2023 | Zhang | G06F 16/2282 |
| 2023/0064886 | A1* | 3/2023 | Truong | G06N 20/00 |

OTHER PUBLICATIONS

Sunita Sarawagi, "Information Extraction," Foundations and Trends in Databases, vol. 1, No. 3 (2007), 43 pages.

"CSV File Reading and Writing," Python 3.10.6 documentation, 8 pages, https://docs.python.org/3/library/csv.html.

* cited by examiner

PROCESSING AND CONVERTING DELIMITED DATA

BACKGROUND

Data may be delimited. For example, a comma-separated values (CSV) file stores data using a comma as a delimiter. Additionally, the CSV file may use a line break (also referred to as a "newline") to further delimit data encoded therein.

SUMMARY

Some implementations described herein relate to a system for converting delimited data into a tabular format. The system may include one or more memories and one or more processors communicatively coupled to the one or more memories. The one or more processors may be configured to receive a set of delimiter-separated values. The one or more processors may be configured to divide the set of delimiter-separated values into a plurality of subsets, wherein each subset corresponds to at least a portion of a column or corresponds to at least a portion of a row. The one or more processors may be configured to generate a plurality of vectors, corresponding to the plurality of subsets, according to an embedding space. The one or more processors may be configured to reduce a dimensionality associated with the plurality of vectors to generate a plurality of reduced vectors. The one or more processors may be configured to compare the plurality of reduced vectors to each other. The one or more processors may be configured to select a row or a column of the set of delimiter-separated values as one or more headers based on comparing the plurality of reduced vectors to each other. The one or more processors may be configured to generate a tabular data structure including the one or more headers distinguished from a remainder of the set of delimiter-separated values.

Some implementations described herein relate to a method of converting delimited data into a tabular format. The method may include receiving, from a data source, a set of delimiter-separated values. The method may include dividing, by a data processing device, the set of delimiter-separated values into a plurality of subsets, wherein each subset corresponds to at least a portion of a column or corresponds to at least a portion of a row. The method may include generating, by the data processing device, a plurality of vectors, corresponding to the plurality of subsets, according to an embedding space. The method may include comparing, by the data processing device, the plurality of vectors to each other. The method may include selecting, by the data processing device, a row or a column of the set of delimiter-separated values as one or more headers based on comparing the plurality of vectors to each other. The method may include outputting a tabular data structure including the one or more headers distinguished from a remainder of the set of delimiter-separated values.

Some implementations described herein relate to a non-transitory computer-readable medium that stores a set of instructions for converting delimited data into a structured format for a device. The set of instructions, when executed by one or more processors of the device, may cause the device to receive a set of delimiter-separated values. The set of instructions, when executed by one or more processors of the device, may cause the device to divide the set of delimiter-separated values into a plurality of subsets, wherein each subset corresponds to at least a portion of a column or corresponds to at least a portion of a row. The set of instructions, when executed by one or more processors of the device, may cause the device to generate a plurality of vectors corresponding to the plurality of subsets. The set of instructions, when executed by one or more processors of the device, may cause the device to compare the plurality of vectors to each other. The set of instructions, when executed by one or more processors of the device, may cause the device to select a row or a column of the set of delimiter-separated values as one or more headers based on comparing the plurality of vectors to each other. The set of instructions, when executed by one or more processors of the device, may cause the device to generate structured data including the one or more headers distinguished from a remainder of the set of delimiter-separated values.

DETAILED DESCRIPTION

Figure 1A:
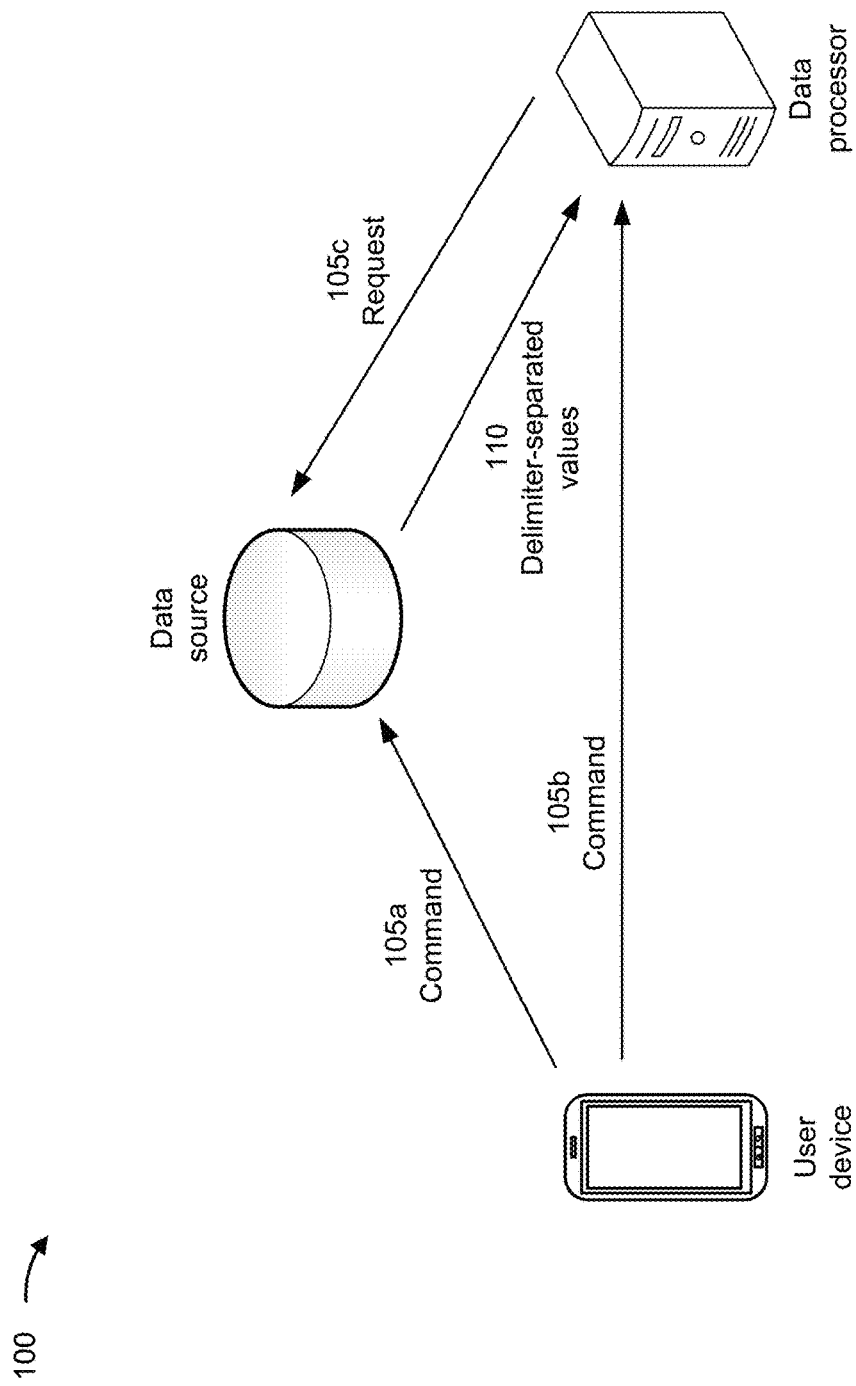
FIGS. 1A, 1B, and 1C are diagrams of an example implementation relating to processing and converting delimited data, in accordance with some embodiments of the present disclosure.

The following detailed description of example implementations refers to the accompanying drawings. The same reference numbers in different drawings may identify the same or similar elements.

Delimiter-separated values (DSVs) refer to data arrays that are organized using delimiter characters. For example, a comma-separated values (CSV) file comprises a text file (e.g., encoded using Unicode, American standard code for information interchange (ASCII), or another type of encoding) that uses commas to delimit fields and newlines to delimit records. Depending on the schema, the commas may separate "columns," and the newlines may separate "rows"; alternatively, the commas may separate rows, and the newlines may separate columns. CSV files are but one example, however. Other files may use different delimiters for rows and/or columns. Additionally, other DSV schema may allow for more than two dimensions of data.

DSVs may be converted to tabular data for processing (e.g., using spreadsheet software or using a machine learning algorithm, among other examples) and/or for displaying to a user. Accordingly, one row (or one column) of the DSVs is typically identified as a header and is differentiated from other rows (or columns). One way to identify the header is to apply rules; for example, Python's has_header function in its csv module identifies a row as a header when remaining rows include numeric rows or when remaining rows include strings of different length than the row identified as a header.

However, these rules generally are coarse and thus often inaccurate. Inaccurate header identification wastes power and processing resources that are expended in correcting errors (e.g., before manipulating the tabular data in spreadsheet software or inputting the tabular data to a machine learning algorithm).

Another way to identify the header is to convert each "cell" of the DSVs into a corresponding vector. For example, a cell may be a single field within a single record of a CSV file. Accordingly, a machine learning model may classify each cell as inside the header or outside the header based on the corresponding vector. The machine learning model is generally more accurate than the rules described above. However, as compared with the rules, significant power and processing resources are expended in converting the cells to vectors and in executing the machine learning model.

Some implementations described herein provide for generating vectors based on a portion of rows or a portion of columns in a set of DSVs. By using only a portion of the rows or a portion of the columns, power and processing resources are conserved as compared with generating vectors for all cells in the set of DSVs. Accordingly, a header may be identified by comparing (or clustering) the vectors. Using comparison or clustering conserves power and processing resources as compared with classifying each cell in the set of DSVs.

A data embedding may be used to generate the vectors. In some implementations, a data embedding may reduce dimensionality of input and/or may be paired with a calculation to reduce dimensionality (e.g., principal components analysis (PCA)). By reducing dimensionality, power and processing resources are conserved as compared with using vectors of same dimension as the input.

Figure 1B:
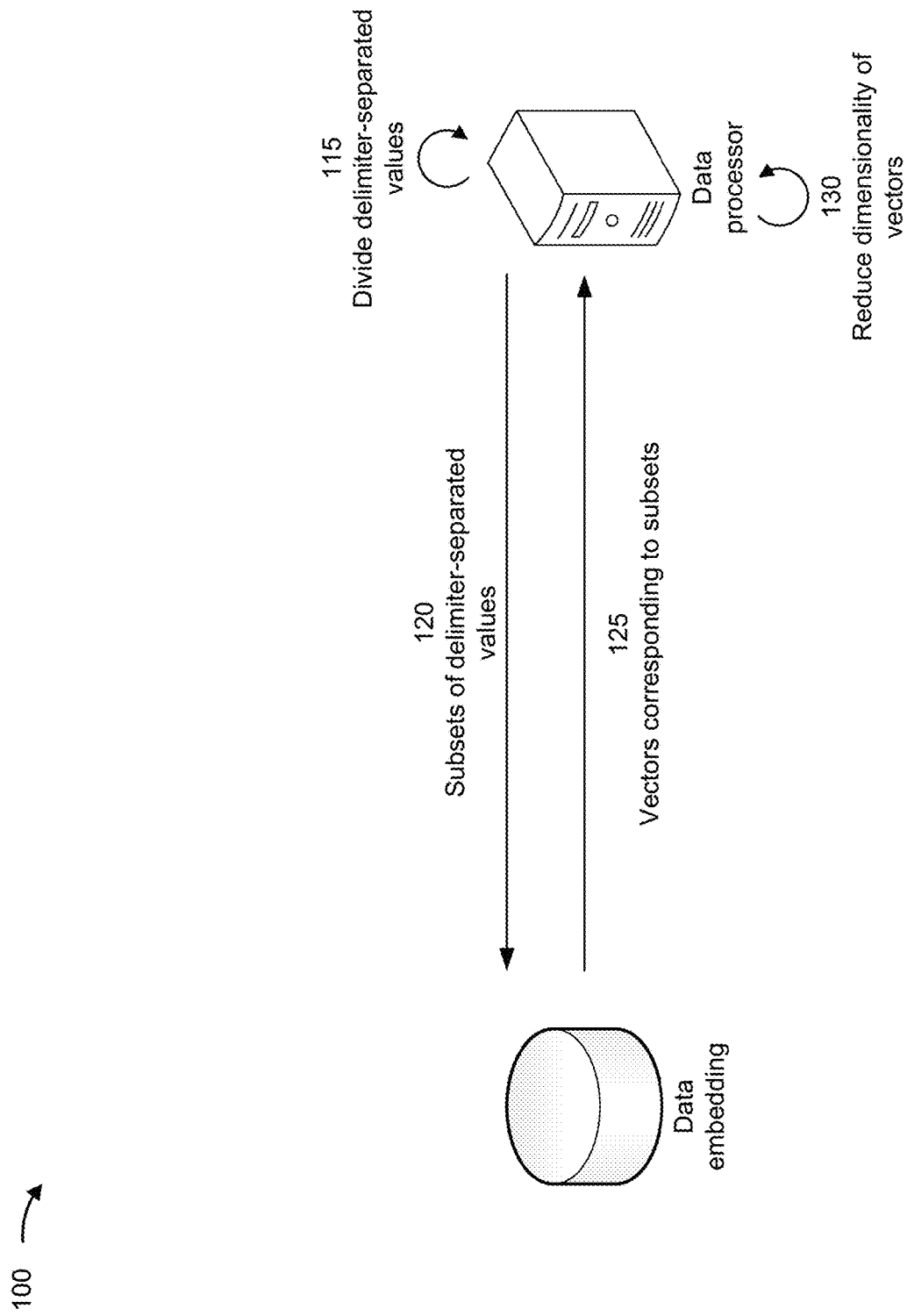
Figure 1C:
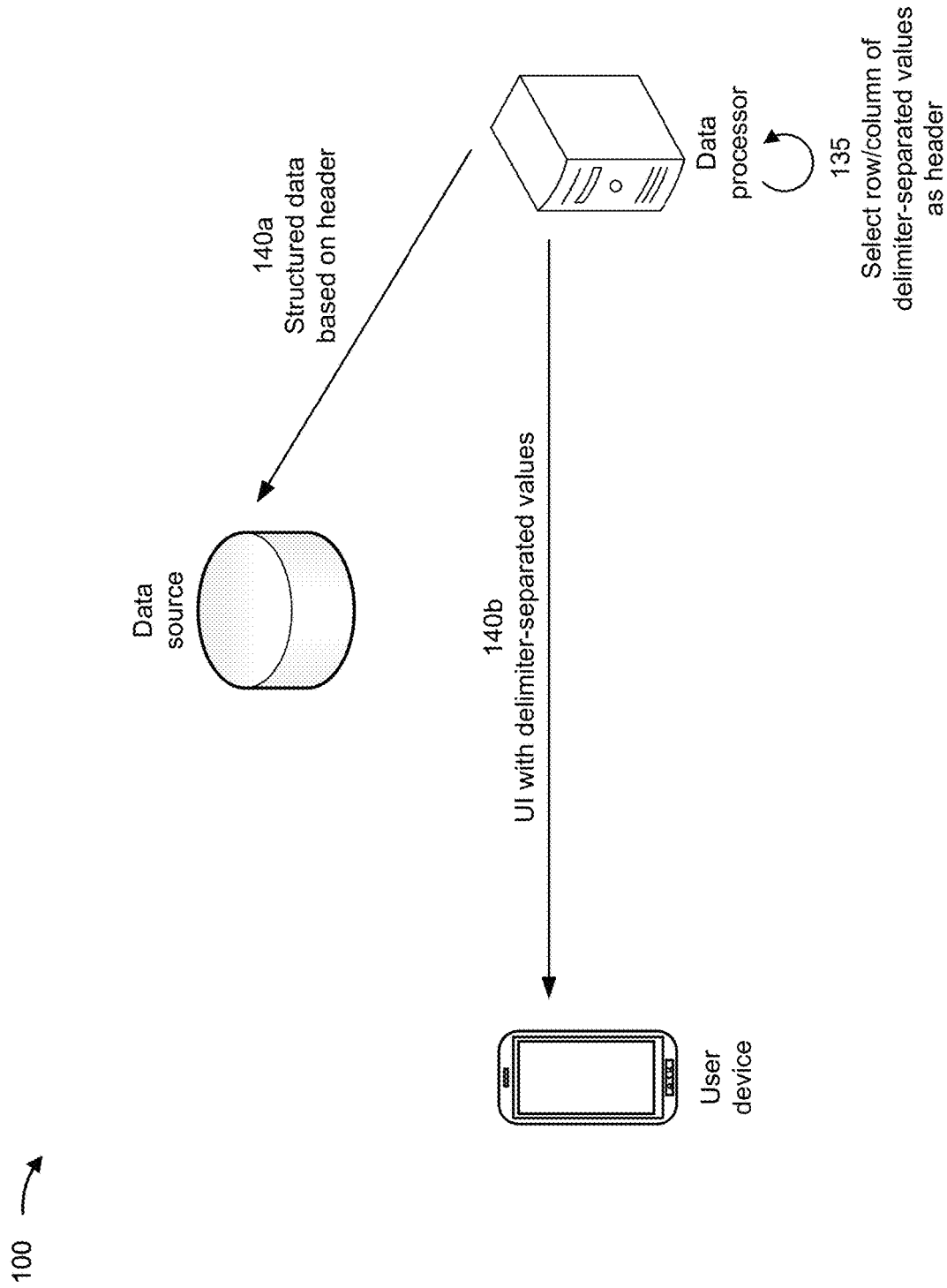

FIGS. 1A-1C are diagrams of an example 100 associated with processing and converting delimited data. As shown in FIGS. 1A-1C, example 100 includes a user device and a data processor. These devices are described in more detail in connection with FIGS. 4 and 5.

As shown in FIG. 1A and by reference number 105a, the user device may transmit, and a data source may receive, a command to provide a set of DSVs to the data processor. The data source may include a memory (e.g., a cache, a storage, or another type of memory) that is physically, logically, and/or virtually integrated with the data processor. Alternatively, the data source may include a memory (e.g., a cache, a storage, or another type of memory) that is physically, logically, and/or virtually integrated with the user device. Alternatively, the data source may be at least partially separate (e.g., physically, logically, and/or virtually) from the data processor. For example, the data source may include one or more devices, such as device 500 of FIG. 5, which may include a standalone server or another type of computing device. The command may include a driver command (e.g., when the data source is local to the user device), a call to an application programming interface (API) associated with the data source, a hypertext transfer protocol (HTTP) request, a file transfer protocol (FTP) request, or another type of remote command.

A user of the user device may trigger the user device to transmit the command. For example, the user may interact with a user interface (UI) (e.g., via a keyboard, a mouse, a touchscreen, or another type of input component) and trigger the user device to transmit the command based on the interaction. In another example, the user device may transmit the command automatically according to a schedule. For example, the user may configure the user device with the schedule such that the user device transmits commands to the data source periodically.

Alternatively, as shown by reference number 105b, the user device may transmit, and the data processor may receive, a command to request the set of DSVs from the data source. For example, the user may trigger the command, or the user device may transmit the command automatically, as described above. The command may include a call to an API associated with the data processor, an HTTP request, an FTP request, or another type of remote command. As shown by reference number 105c, the data processor may transmit, and the data source may receive, a request for the set of DSVs. For example, the request may include a driver command (e.g., when the data source is local to the data processor), a call to an API associated with the data source, an HTTP request, an FTP request, or another type of remote command.

Although described in connection with the user device transmitting a command, other implementations may include the data processor requesting the set of DSVs without a command from the user device. For example, the data processor may request the set of DSVs according to a schedule. The schedule may be received from the user device or otherwise programmed by the user.

As shown by reference number 110, the data source may transmit, and the data processor may receive, the set of DSVs. For example, the set of DSVs may include a plurality of rows separated by line breaks and a plurality of columns separated by delimiter characters (e.g., commas, tabs, colons, semicolons, spaces, or vertical bars also referred to as "pipes," among other examples). In another example, the set of DSVs may include a plurality of rows separated by delimiter characters and a plurality of columns separated by line breaks.

In some implementations, the data processor may receive (e.g., from the user device) a filename and may extract, from a file corresponding to the filename, the set of DSVs. For example, the user device may indicate a filename of a file external to the data processor (e.g., on a remote data source) or local to the data processor (e.g., on an integrated data source), and the data processor may receive the file from the data source, as described above, and extract the set of DSVs from the file. In another example, the user may indicate a filename of a file local to the user device (e.g., on an integrated data source), and the user device may transmit the file to the data processor such that the data processor may extract the set of DSVs from the file.

As shown in FIG. 1B and by reference number 115, the data processor may divide the set of DSVs into a plurality of subsets. Each subset may correspond to at least a portion of a column or may correspond to at least a portion of a row. For example, the data processor may select only part of each row to use in order to reduce power and processing resources consumed in converting the subsets to vectors, as described in connection with reference numbers 120 and 125. In another example, the data processor may select only part of each column to use in order to reduce power and processing resources consumed in converting the subsets to vectors, as described in connection with reference numbers 120 and 125.

In some implementations, the data processor may randomly (or pseudo-randomly) select values from rows (e.g., one or more rows) and a first column, of the set of DSVs, as the first subset. Accordingly, the data processor may select values from corresponding rows and remaining columns (e.g., one or more remaining columns), of the set of DSVs, as the remaining subsets (e.g., one or more remaining subsets). Similarly, the data processor may randomly (or pseudo-randomly) select values from columns (e.g., one or more columns) and a first row, of the set of DSVs, as the first subset. Accordingly, the data processor may select values from corresponding columns and remaining rows (e.g., one or more remaining rows), of the set of DSVs, as the remaining subsets (e.g., one or more remaining subsets).

As shown by reference number 120, the data processor may apply a data embedding (e.g., defining an embedding space) to the plurality of subsets. The embedding space may represent a multi-dimensional space encompassing possible vector values corresponding to possible inputs (in this case, values from the set of DSVs). In some implementations, the data processor may apply an existing embedding space (e.g., from a previous conversion of DSVs to structured data). The data processor may receive (e.g., from the user device) an indication of the embedding space to use. For example, the user device may transmit a filename corresponding to file encoding the existing embedding space or another type of indicator of the existing embedding space. In another example, the data processor may identify the existing embedding space to apply based at least in part on the set of DSVs (e.g., by pattern matching the set of DSVs to similar DSV sets from previous conversions and/or matching a file type of a file encoding the set of DSVs to a file type of files encoding DSV sets from previous conversions, among other examples).

Alternatively, the data processor may generate a new embedding space to use. For example, the data processor may determine which characters, words, integers, decimals, and/or other alphanumeric symbols are included in the values from the set of DSVs. Accordingly, the data processor may generate an embedding space that captures symbols included in the values from the set of DSVs. In some implementations, the data processor may select an algorithm to convert the values from the set of DSVs to vectors, as described below, based on the generated embedding space. Alternatively, the data processor may select the algorithm based on characteristics of the values from the set of DSVs (e.g., value length, value type, and/or which alphanumeric symbols are included, among other examples), such that the embedding space is based on the algorithm.

As shown by reference number 125, the data processor may generate a plurality of vectors, corresponding to the plurality of subsets, according to the data embedding. Each vector may include one or more values (e.g., integer values or decimal values) calculated from a corresponding DSV from the plurality of subsets. As used herein, "vector" may refer, for example, to a mathematical representation that includes a plurality of numbers, rather than a scalar. Vectors are often one-dimensional, but some vectors may include numbers across two dimensions, three dimensions, or more.

Although described as using subsets, of the set of DSVs, in order to conserve power and processing resource, the data processor may alternatively convert an entire row (or portion of a row) to a single vector and/or an entire column (or portion of a column) to a single vector. By converting rows or columns into a single vector rather than multiple vectors, the data processor conserves power and processing resources.

In some implementations, as shown by reference number 130, the data processor may reduce a dimensionality associated with the plurality of vectors. Accordingly, the data processor may generate a plurality of reduced vectors. In one example, the data processor may apply an autoencoder to reduce the dimensionality. In another example, the data processor may apply a PCA to reduce the dimensionality. Alternatively, the algorithm that transforms the plurality of subsets to the plurality of vectors may inherently reduce the dimensionality of the input, which is the dimensionality of the plurality of subsets.

As used herein, "dimensionality" of a space may refer, for example, to a quantity of coordinates used to identify a point within the space. For example, a Euclidean plane is a space with a dimensionality of two while a Minkowski space is a space with a dimensionality of four. Accordingly, in one example, a three-dimensional Cartesian vector has reduced dimensionality when projected onto a Euclidean plane to result in a two-dimensional Cartesian vector. In another example, a four-dimensional tesseract has reduced dimensionality when projected onto a three-dimensional space, resulting in a three-dimensional envelope.

As shown in FIG. 1C and by reference number 135, the data processor may select a row or a column, of the set of DSVs, as a header (e.g., one or more headers) based on comparing the plurality of reduced vectors to each other. For example, the data processor may select the row (or the column) that is associated with vectors (of the plurality of reduced vectors) that are farther from remaining vectors (of the plurality of reduced vectors). In some implementations, the data processor may cycle through pairs of the (reduced) vectors in order to compare the plurality of reduced vectors to each other. For example, the data processor may calculate a set of distances, where each distance corresponds to a pair of (reduced) vectors of the plurality of (reduced) vectors. Based on the largest distances in the set of distances, the data processor may select the row (or the column) associated with vectors that are associated with the largest distances.

Additionally, or alternatively, the data processor may apply a clustering algorithm (e.g., as described in connection with FIG. 3) to the plurality of (reduced) vectors. Accordingly, the data processor may select the row (or the column) associated with an outlier cluster. For example, the data processor may calculate a set of distances, where each distance corresponds to a pair of clusters. Based on the largest distances in the set of distances, the data processor may select the row (or the column) associated with the cluster that is associated with the largest distances. Using a clustering algorithm or comparing the vectors conserves power and processing resources as compared with separately classifying each value in the set of DSVs.

In some implementations, as shown by reference number 140a, the data processor may generate structured data including the header distinguished from a remainder of the set of DSVs. For example, the data processor may store a flag, a bitmap, or another type of indication that the row (or the column) identified as the header is distinct from remaining rows (or remaining columns). The structured data may include relational data (e.g., a tabular data structure), graphical data, or a document store. As used herein, a data structure may be "tabular" when the information of the data structure is organized into one or more columns and one or more rows. For example, a Microsoft Excel spreadsheet is a tabular data structure, as is a structured query language (SQL) database. Other terms for "row" may include "record" or "tuple," among other examples, and other terms for "column" may include "field," "property," "attribute," or "parameter," among other examples. In some implementations, as shown in FIG. 1C, the data processor may transmit the structured data to the data source for storage. Additionally, or alternatively, the data processor may transmit the structured data to the user device.

In addition to at least one row (or column) that functions as a header, the set of DSVs may further include metadata (e.g., from the file encoding the set of DSVs). Accordingly, to distinguish the metadata from a row (or column) identified as a header, the data processor may validate that the identified header includes delimiter characters. For example, when the delimiter is a comma, the data processor may select a row (or column) as a header only when the row (or column) includes at least one comma. Additionally, or alternatively, the data processor may validate that the identified header is associated with a same dimensionality as other rows (or columns). For example, when each row (or column) in the set of DSVs includes three values (separated by delimiter characters), the data processor may select a row (or column) as a header only when the row (or column) also includes three values (separated by delimiter characters).

In some implementations, the data processor may store a file encoding the structured data (e.g., on the data source and/or the user device). As described above, the file may encode the header separately from the remainder of the set of DSVs. In some implementations, the data processor may receive (e.g., from the user device) a filename and may store the structured data in a file corresponding to the filename. For example, the user device may indicate a filename of a file external to the data processor (e.g., on a remote data source) or local to the data processor (e.g., on an integrated data source), and the data processor may transmit the file to the data source for storage, as described above. In another example, the user may indicate a filename of a file local to the user device (e.g., on an integrated data source), and the user device may store the file from the data processor.

Additionally, or alternatively, the data processor may generate instructions for a UI showing the structured data. The UI may show the header differently than the remainder of the set of DSVs. For example, the UI may show the header as bolded, italicized, underlined, larger, and/or otherwise distinct from the remainder of the set of DSVs. Accordingly, as shown by reference number 140b, the data processor may transmit, and the user device may receive, the instructions for the UI. The user device may therefore show (e.g., using an output component) the UI to the user of the user device.

By using techniques as described in connection with FIGS. 1A-1C, only a portion of the rows or a portion of the columns are used to identify the header, which conserves power and processing resources as compared with generating vectors for all values in the set of DSVs. Additionally, using comparison or clustering conserves power and processing resources as compared with classifying each value in the set of DSVs.

As indicated above, FIGS. 1A-1C are provided as an example. Other examples may differ from what is described with regard to FIGS. 1A-1C.

Figure 2:
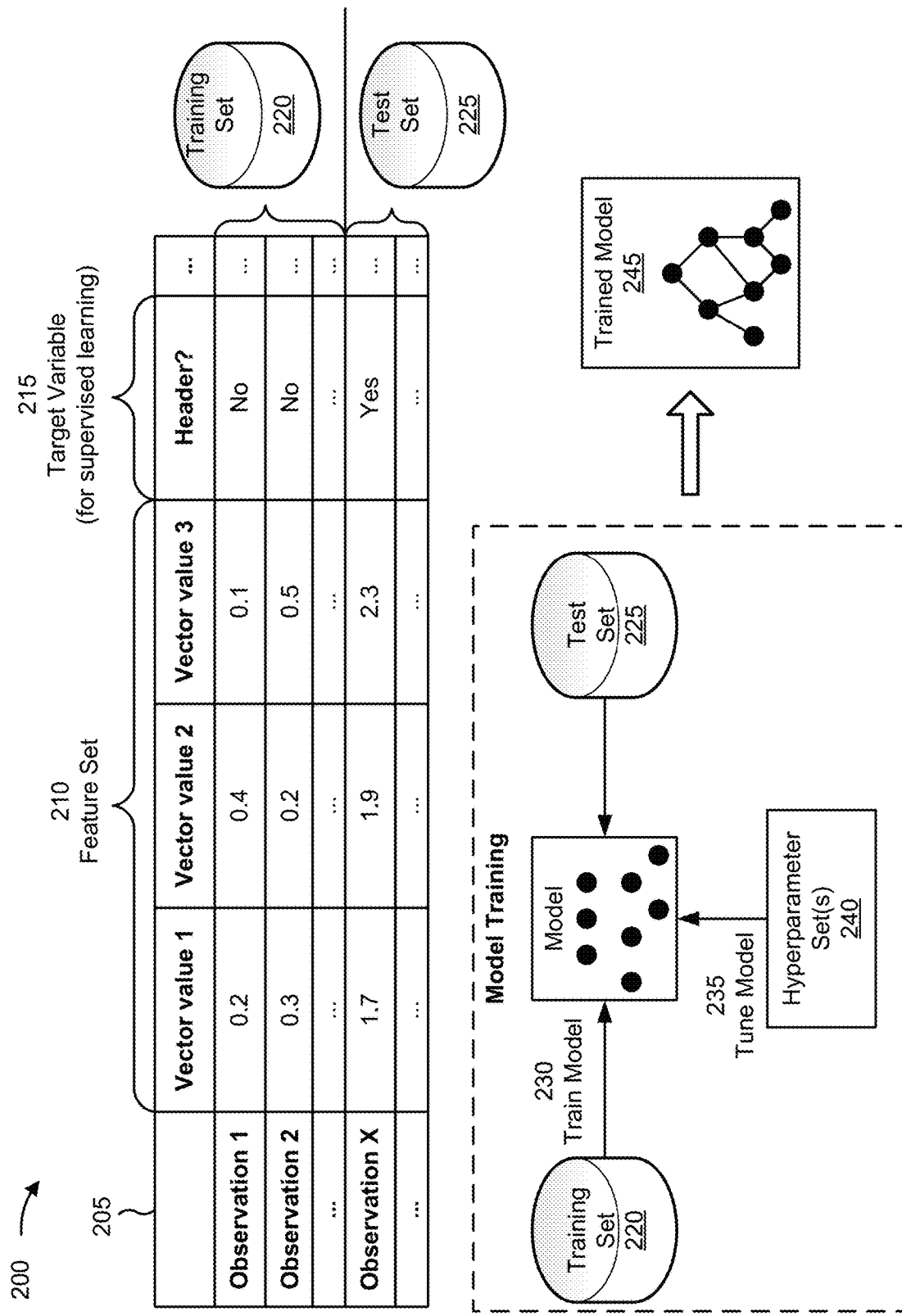
FIG. 2 is a diagram illustrating an example of training a machine learning model, in accordance with some embodiments of the present disclosure.

FIG. 2 is a diagram illustrating an example 200 of training a machine learning model in connection with processing and converting delimited data. The machine learning model training described herein may be performed using a machine learning system. The machine learning system may include or may be included in a computing device, a server, a cloud computing environment, or the like, such as the data processor described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from the data processor, as described elsewhere herein. In some implementations, the machine learning system may receive the set of observations (e.g., as input) from a user device.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the data processor. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first vector value, a second vector value, a third vector value, and so on. The vector values may correspond to a subset of a set of DSVs or to a row (or a column) or portion thereof from the set of DSVs, as described in connection with FIG. 1B. As shown, for a first observation, the first feature may have a value of 0.2, the second feature may have a value of 0.4, the third feature may have a value of 0.1, and so on. These features and feature values are provided as examples, and may differ in other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is a header classification, which has a value of No for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that may include a first subset of observations, of the set of observations, and a test set 225 that may include a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
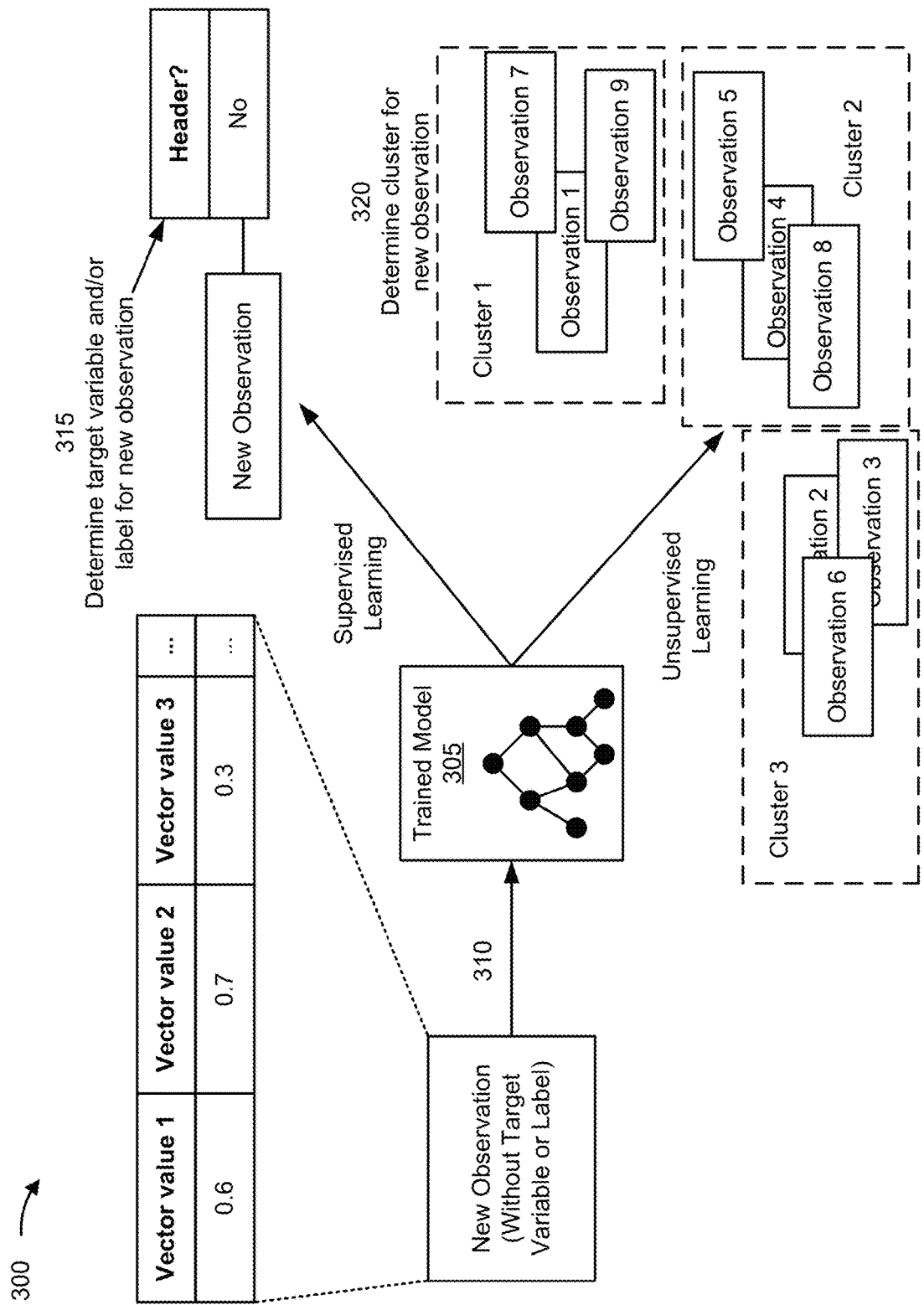
FIG. 3 is a diagram illustrating an example of applying a trained machine learning model to a new observation, in accordance with some embodiments of the present disclosure.

FIG. 3 is a diagram illustrating an example 300 of applying a trained machine learning model to a new observation associated with processing and converting delimited data. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, or a cloud computing environment, such as the data processor.

As shown by reference number 310, the machine learning system may receive a new observation (or a set of new observations), and may input the new observation to the machine learning model 305. As shown, the new observation may include a first vector value of 0.6, a second vector value of 0.7, a third vector value of 0.3, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. For example, supervised learning may be applied when the feature values represent a row or a portion thereof (or a column) of a set of DSVs. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed. For example, unsupervised learning may be applied when the feature values represent a subset of a set of DSVs.

In some implementations, the trained machine learning model 305 may predict a value of No for the target variable of header classification for the new observation, as shown by reference number 315. Based on this prediction (e.g., based on the value having a particular label or classification or based on the value satisfying or failing to satisfy a threshold), the machine learning system may provide a recommendation and/or output for determination of a recommendation, such as encoding a row or a column associated with the new observation as usual. Additionally, or alternatively, the machine learning system may perform an automated action and/or may cause an automated action to be performed (e.g., by instructing another device to perform the automated action), such as generating instructions for a UI showing a row or a column associated with the new observation as usual. As another example, if the machine learning system were to predict a value of Yes for the target variable of header classification, then the machine learning system may provide a different recommendation (e.g., encoding a row or a column associated with the new observation as a header) and/or may perform or cause performance of a different automated action (e.g., generating instructions for a UI showing a row or a column associated with the new observation as a header). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., headers), then the machine learning system may provide a first recommendation, such as encoding DSVs associated with the new observation as part of a header. Additionally, or alternatively, the machine learning system may perform a first automated action and/or may cause a first automated action to be performed (e.g., by instructing another device to perform the automated action) based on classifying the new observation in the first cluster, such as generating instructions for a UI showing DSVs associated with the new observation as part of a header. As another example, if the machine learning system were to classify the new observation in a second cluster (e.g., not headers), then the machine learning system may provide a second (e.g., different) recommendation (e.g., encoding DSVs associated with the new observation as usual) and/or may perform or cause performance of a second (e.g., different) automated action, such as generating instructions for a UI showing DSVs associated with the new observation as usual.

Although FIG. 3 is described in connection with two clusters, other implementations may include additional clusters. For example, a third cluster may be associated with metadata. Accordingly, the trained machine learning model 305 may classify metadata separately from rows (and/or columns) identified as the header. For example, the trained machine learning model 305 may use the presence of delimiters, as described herein, to distinguish the metadata from the header. Additionally, or alternatively, a file may encode multiple data sets and/or different kinds of data. Accordingly, a plurality of clusters may be associated with data, where each cluster is associated with a different data set and/or a different kind of data. As a result, the header is identified as distinct from multiple data sets and/or multiple kinds of data.

In this way, the machine learning system may apply a rigorous and automated process to identifying headers. The machine learning system may enable recognition and/or identification of tens, hundreds, thousands, or millions of features and/or feature values for tens, hundreds, thousands, or millions of observations, thereby increasing accuracy and consistency and reducing delay associated with identifying headers relative to requiring computing resources to be allocated for rules (e.g., Python's rules) to identify headers. Additionally, by encoding a subset of the set of DSVs (or entire rows and columns of the set of DSVs) as feature vectors, the machine learning system conserves power and processing resources as compared with encoding each value in the set of DSVs separately.

As indicated above, FIG. 3 is provided as an example. Other examples may differ from what is described in connection with FIG. 3.

Figure 4:
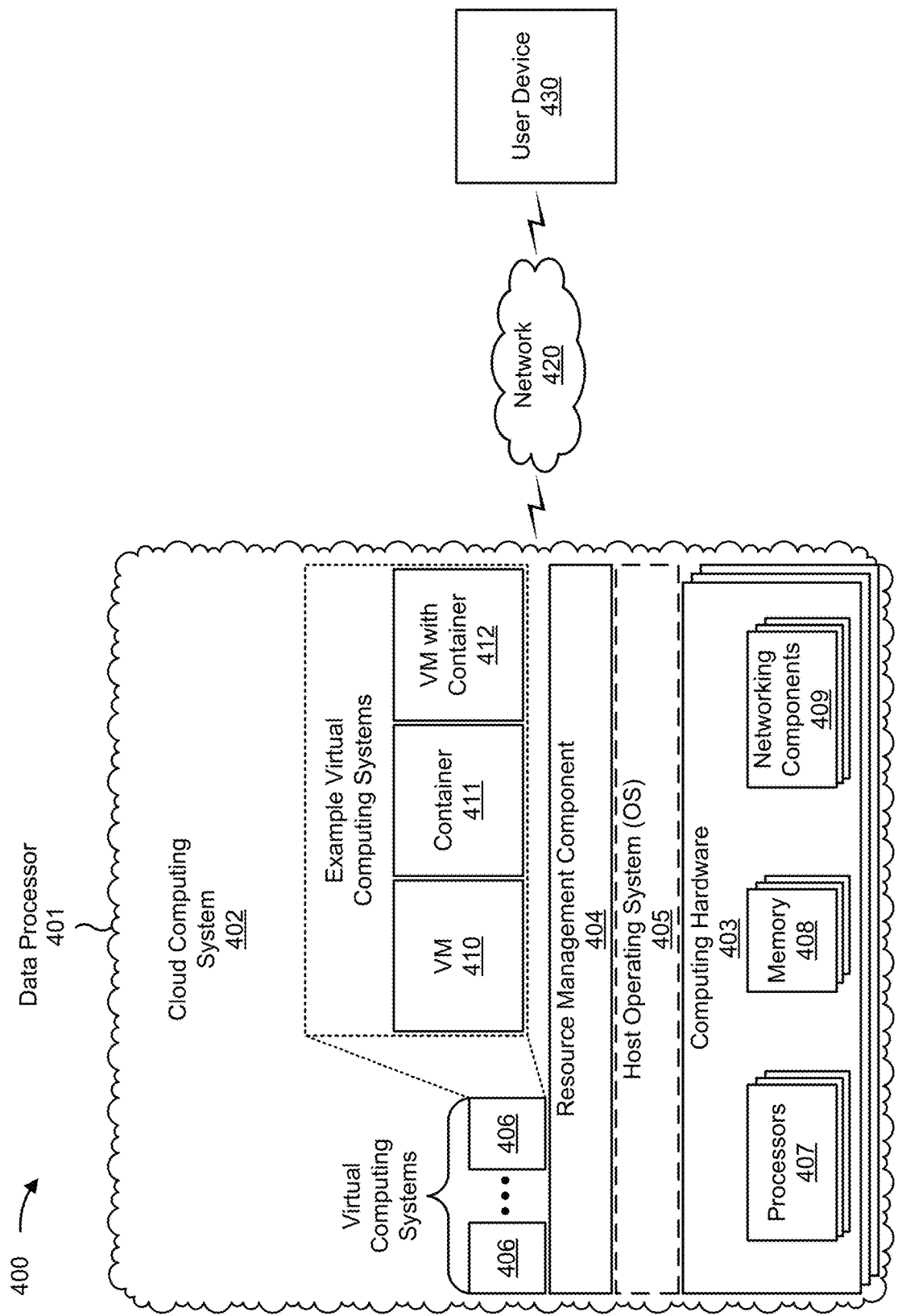
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a data processor 401, which may include one or more elements of and/or may execute within a cloud computing system 402. The cloud computing system 402 may include one or more elements 403-412, as described in more detail below. As further shown in FIG. 4, environment 400 may include a network 420 and/or a user device 430. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the data processor 401 may include one or more elements 403-412 of the cloud computing system 402, may execute within the cloud computing system 402, and/or may be hosted within the cloud computing system 402, in some implementations, the data processor 401 may not be cloud-based (e.g., may be implemented outside of a cloud computing system) or may be partially cloud-based. For example, the data processor 401 may include one or more devices that are not part of the cloud computing system 402, such as device 500 of FIG. 5, which may include a stand-alone server or another type of computing device. The data processor 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The user device 430 may include one or more devices capable of receiving, generating, storing, processing, and/or providing information associated with DSVs, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
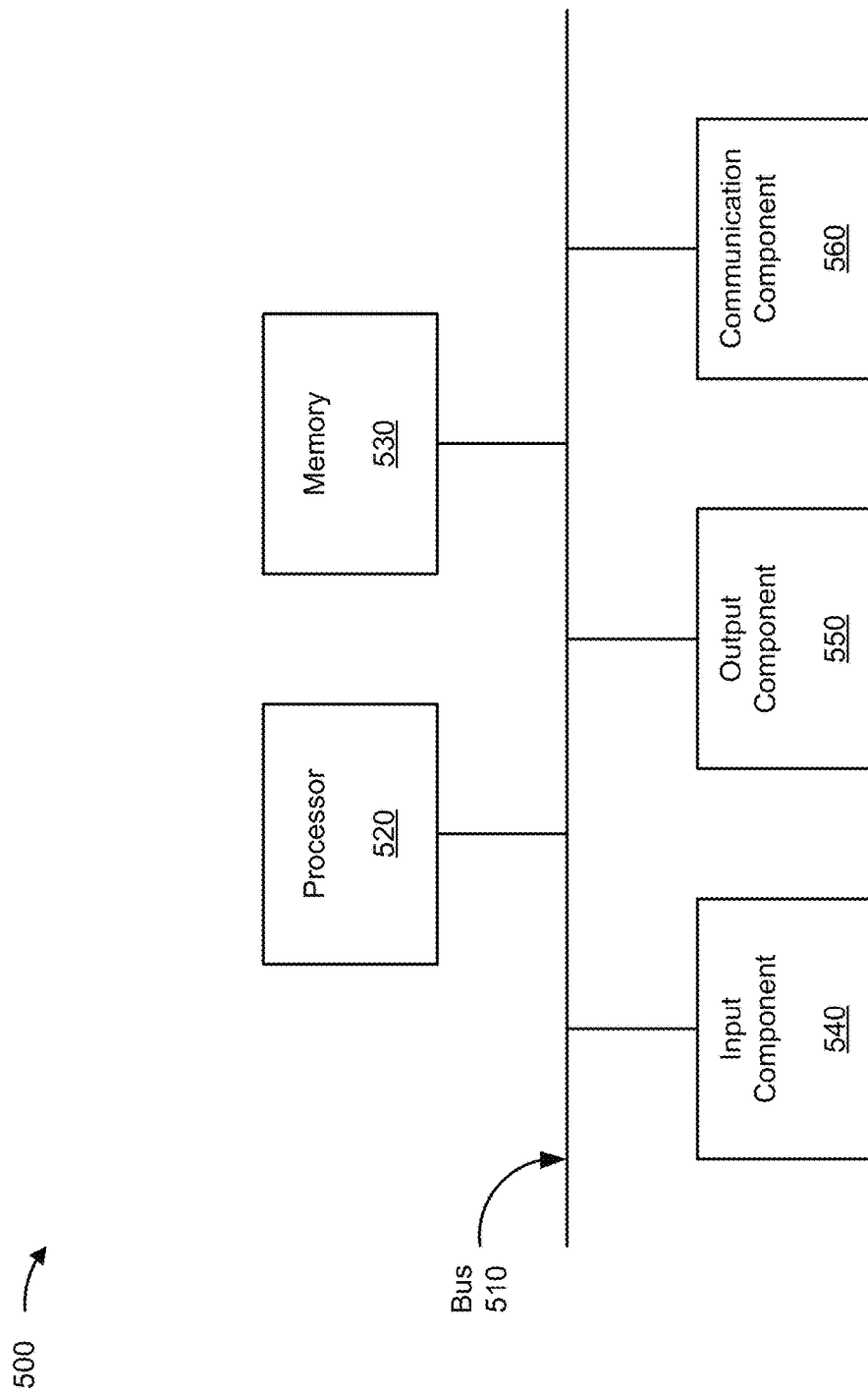
FIG. 5 is a diagram of example components of one or more devices of FIG. 4, in accordance with some embodiments of the present disclosure.

FIG. 5 is a diagram of example components of a device 500 associated with processing and converting delimited data. The device 500 may correspond to data processor 401 and/or user device 430. In some implementations, the data processor 401 and/or the user device 430 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
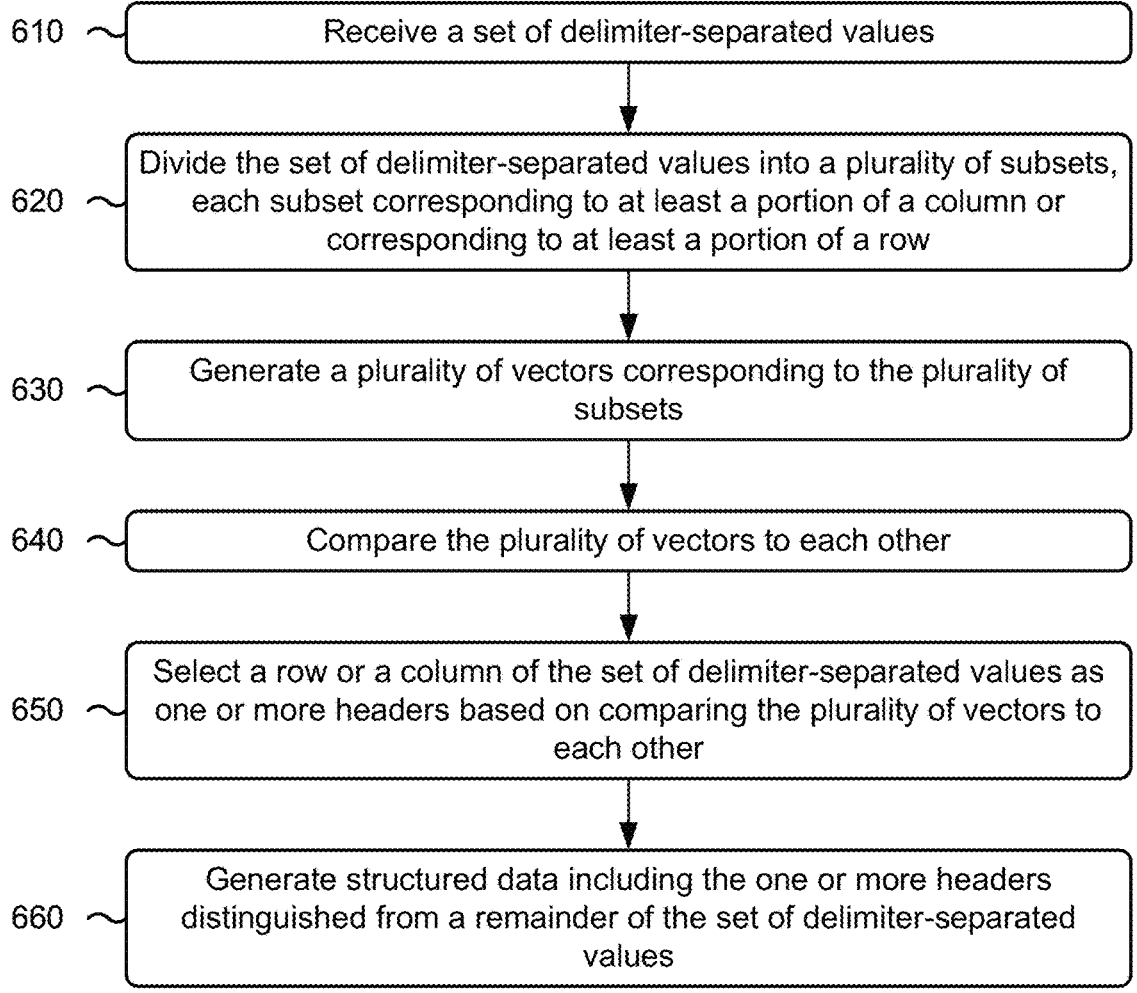
FIG. 6 is a flowchart of an example process relating to processing and converting delimited data, in accordance with some embodiments of the present disclosure.

FIG. 6 is a flowchart of an example process 600 associated with processing and converting delimited data. In some implementations, one or more process blocks of FIG. 6 may be performed by the data processor 401. In some implementations, one or more process blocks of FIG. 6 may be performed by another device or a group of devices separate from or including the data processor 401, such as the user device 430. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving a set of DSVs (block 610). For example, the data processor 401 (e.g., using processor 520, memory 530, input component 540, and/or communication component 560) may receive a set of DSVs, as described above in connection with reference number 110 of FIG. 1A. As an example, a data source may transmit, and the data processor 401 may receive, the set of DSVs. For example, the set of DSVs may include a plurality of rows separated by line breaks and a plurality of columns separated by delimiter characters (e.g., commas, tabs, colons, semicolons, spaces, or pipes, among other examples). In another example, the set of DSVs may include a plurality of rows separated by delimiter characters and a plurality of columns separated by line breaks.

As further shown in FIG. 6, process 600 may include dividing the set of DSVs into a plurality of subsets, each subset corresponding to at least a portion of a column or corresponding to at least a portion of a row (block 620). For example, the data processor 401 (e.g., using processor 520 and/or memory 530) may divide the set of DSVs into a plurality of subsets, where each subset corresponds to at least a portion of a column or corresponds to at least a portion of a row, as described above in connection with reference number 115 of FIG. 1B. As an example, the data processor 401 may randomly (or pseudo-randomly) select values from rows and a first column, of the set of DSVs, as the first subset. Accordingly, the data processor 401 may select values from corresponding rows and remaining columns, of the set of DSVs, as the remaining subsets. Similarly, the data processor 401 may randomly (or pseudo-randomly) select values from columns and a first row, of the set of DSVs, as the first subset. Accordingly, the data processor 401 may select values from corresponding columns and remaining rows, of the set of DSVs, as the remaining subsets.

As further shown in FIG. 6, process 600 may include generating a plurality of vectors corresponding to the plurality of subsets (block 630). For example, the data processor 401 (e.g., using processor 520 and/or memory 530) may generate a plurality of vectors corresponding to the plurality of subsets, as described above in connection with reference number 125 of FIG. 1B. As an example, the data processor 401 may select an existing data embedding or generate a new data embedding to use to convert values of the plurality of subsets to the plurality of vectors. Each vector may include one or more values (e.g., integer values or decimal values) calculated from a corresponding DSV from the plurality of subsets.

As further shown in FIG. 6, process 600 may include comparing the plurality of vectors to each other (block 640). For example, the data processor 401 (e.g., using processor 520 and/or memory 530) may compare the plurality of vectors to each other, as described above in connection with reference number 135 of FIG. 1C. As an example, the data processor 401 may cycle through pairs of the vectors in order to compare the plurality of reduced vectors to each other. For example, the data processor 401 may calculate a set of distances, where each distance corresponds to a pair of vectors of the plurality of vectors. Additionally, or alternatively, the data processor 401 may apply a clustering algorithm (e.g., as described in connection with FIG. 3) to the plurality of vectors.

As further shown in FIG. 6, process 600 may include selecting a row or a column of the set of DSVs as one or more headers based on comparing the plurality of vectors to each other (block 650). For example, the data processor 401 (e.g., using processor 520 and/or memory 530) may select a row or a column of the set of DSVs as one or more headers based on comparing the plurality of vectors to each other, as described above in connection with reference number 135 of FIG. 1C. As an example, based on a set of distances between the vectors, the data processor 401 may select the row (or the column) associated with vectors that are associated with the largest distances. Additionally, or alternatively, the data processor 401 may select the row (or the column) associated with an outlier cluster from a clustering algorithm.

As further shown in FIG. 6, process 600 may include generating structured data including the one or more headers distinguished from a remainder of the set of DSVs (block 660). For example, the data processor 401 (e.g., using processor 520 and/or memory 530) may generate structured data including the one or more headers distinguished from a remainder of the set of DSVs, as described above in connection with reference number 140a of FIG. 1C. As an example, the data processor 401 may store a flag, a bitmap, or another type of indication that the one or more rows (or the one or more columns) identified as the one or more headers are distinct from remaining rows (or remaining columns). The structured data may include relational data (e.g., a tabular data structure), graphical data, or a document store. In some implementations, the data processor 401 may transmit the structured data to the data source for storage.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C, 2, and/or 3. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for converting delimited data into a tabular format, the system comprising:
   one or more memories; and
   one or more processors, communicatively coupled to the one or more memories, configured to:
   receive a set of delimiter-separated values;
   divide the set of delimiter-separated values into a plurality of subsets, wherein each subset corresponds to at least a portion of a column or corresponds to at least a portion of a row;
   identify, based on matching a file type of a file encoding the set of delimiter-separated values to a file type of a file encoding another set of delimiter-separated values associated with a previous conversion into the tabular format, an existing embedding space associated with the previous conversion to apply to the plurality of subsets;
   generate a plurality of vectors, corresponding to the plurality of subsets, according to the existing embedding space;
   reduce a dimensionality associated with the plurality of vectors to generate a plurality of reduced vectors;
   compare, using a clustering algorithm, the plurality of reduced vectors to each other;
   select, based on the comparing the plurality of reduced vectors to each other, a row or a column of the set of delimiter-separated values associated with an outlier cluster from the clustering algorithm as one or more headers; and
   generate a tabular data structure including the one or more headers distinguished from a remainder of the set of delimiter-separated values.

2. The system of claim 1, wherein the one or more processors are further configured to:
   receive an indication of the existing embedding space to use.

3. The system of claim 1, wherein the one or more processors are further configured to:
   select the existing embedding space to use based at least in part on the set of delimiter-separated values.

4. The system of claim 1, wherein the one or more processors, to reduce the dimensionality associated with the plurality of vectors, are configured to:
   apply an autoencoder to reduce the dimensionality.

5. The system of claim 1, wherein the one or more processors, to reduce the dimensionality associated with the plurality of vectors, are configured to:
   apply a principal components analysis to reduce the dimensionality.

6. The system of claim 1, wherein the one or more processors, to generate the tabular data structure, are configured to:
   store a file encoding the tabular data structure, wherein the file encodes the one or more headers separately from the remainder of the set of delimiter-separated values.

7. The system of claim 1, wherein the one or more processors, to generate the tabular data structure, are configured to:
   generate instructions for a user interface (UI) showing the tabular data structure, wherein the UI shows the one or more headers differently than the remainder of the set of delimiter-separated values.

8. The system of claim 1, wherein the one or more processors are further configured to:
   randomly select values from a first column and one or more rows of the set of delimiter-separated values.

9. A method of converting delimited data into a tabular format, comprising:
   receiving, from a data source, a set of delimiter-separated values;

dividing, by a data processing device, the set of delimiter-separated values into a plurality of subsets, wherein each subset corresponds to at least a portion of a column or corresponds to at least a portion of a row;

identifying, based on matching a file type of a file encoding the set of delimiter-separated values to a file type of a file encoding another set of delimiter-separated values associated with a previous conversion into the tabular format, an existing embedding space associated with the previous conversion to apply to the plurality of subsets;

generating, by the data processing device, a plurality of vectors, corresponding to the plurality of subsets, according to the existing embedding space;

comparing, by the data processing device and using a clustering algorithm, the plurality of vectors to each other;

selecting, by the data processing device and based on the comparing the plurality of vectors to each other, a row or a column of the set of delimiter-separated values associated with an outlier cluster from the clustering algorithm as one or more headers; and outputting a tabular data structure including the one or more headers distinguished from a remainder of the set of delimiter-separated values.

10. The method of claim 9, wherein the set of delimiter-separated values includes a plurality of rows separated by line breaks and a plurality of columns separated by delimiter characters.

11. The method of claim 9, wherein the set of delimiter-separated values includes a plurality of rows separated by delimiter characters and a plurality of columns separated by line breaks.

12. The method of claim 9, wherein comparing the vectors to each other comprises:

calculating a set of distances, wherein each distance corresponds to a pair of vectors of the plurality of vectors.

13. The method of claim 9, wherein selecting a row or a column as the one or more headers comprises:

selecting the row or the column that is associated with one or more vectors, of the plurality of vectors, that are farthest from one or more remaining vectors of the plurality of vectors.

14. The method of claim 9, wherein outputting the tabular data structure comprises:

transmitting the tabular data structure to a user device.

15. A non-transitory computer-readable medium storing a set of instructions for converting delimited data into a structured format, the set of instructions comprising:

one or more instructions that, when executed by one or more processors of a device, cause the device to:

receive a set of delimiter-separated values;

divide the set of delimiter-separated values into a plurality of subsets, wherein each subset corresponds to at least a portion of a column or corresponds to at least a portion of a row;

identify, based on comparing a file type of a file encoding the set of delimiter-separated values to a file type of a file encoding another set of delimiter-separated values associated with a previous conversion into the structured format, an existing embedding space associated with the previous conversion to apply to the plurality of subsets;

generate a plurality of vectors, corresponding to the plurality of subsets, according to the identified existing embedding space;

compare, using a clustering algorithm, the plurality of vectors to each other;

select, based on the comparing the plurality of vectors to each other, a row or a column of the set of delimiter-separated values associated with an outlier cluster from the clustering algorithm as one or more headers; and generate structured data including the one or more headers distinguished from a remainder of the set of delimiter-separated values.

16. The non-transitory computer-readable medium of claim 15, wherein the structured data comprises relational data, graphical data, or a document store.

17. The non-transitory computer-readable medium of claim 15, wherein the one or more instructions, that cause the device to receive the set of delimiter-separated values, cause the device to:

receive a filename; and extract, from a file corresponding to the filename, the set of delimiter-separated values.

18. The non-transitory computer-readable medium of claim 15, wherein the one or more instructions, that cause the device to divide the set of delimiter-separated values, cause the device to:

select a first subset, of the plurality of subsets, as including values from one or more rows and a first column of the set of delimiter-separated values; and select remaining subsets, of the plurality of subsets, as including values from the one or more rows and one or more remaining columns of the set of delimiter-separated values.

19. The non-transitory computer-readable medium of claim 15, wherein the one or more instructions, that cause the device to divide the set of delimiter-separated values, cause the device to:

select a first subset, of the plurality of subsets, as including values from a first row of the set of delimiter-separated values; and select remaining subsets, of the plurality of subsets, as including values from one or more remaining rows of the set of delimiter-separated values.

20. The non-transitory computer-readable medium of claim 15, wherein the one or more instructions further cause the device to:

receive a filename; and store, in a file corresponding to the filename, the structured data.

* * * * *